N. WESTCOTT.
Draft Attachments for Plows.

No. 144,811. Patented Nov. 18, 1873.

UNITED STATES PATENT OFFICE.

NORMAN WESTCOTT, OF NELSON, ASSIGNOR OF ONE-HALF HIS RIGHT TO DWIGHT CROSS, OF MORRISVILLE, NEW YORK.

IMPROVEMENT IN DRAFT ATTACHMENTS FOR PLOWS.

Specification forming part of Letters Patent No. 144,811, dated November 18, 1873; application filed May 27, 1873.

*To all whom it may concern:*

Be it known that I, NORMAN WESTCOTT, of Nelson, in the county of Madison and State of New York, have invented a certain Improvement in Plows, of which the following is a specification:

My invention relates to a plow which is drawn by a pole linked to it by a coupling in such a manner that the plow and pole can oscillate both vertically and horizontally, but not axially. My improvement consists in combining a single gage-wheel with the pole, and making the pole vertically adjustable on the coupling, for the purpose of regulating the depth of cut of the share of the plow.

Figure 1:
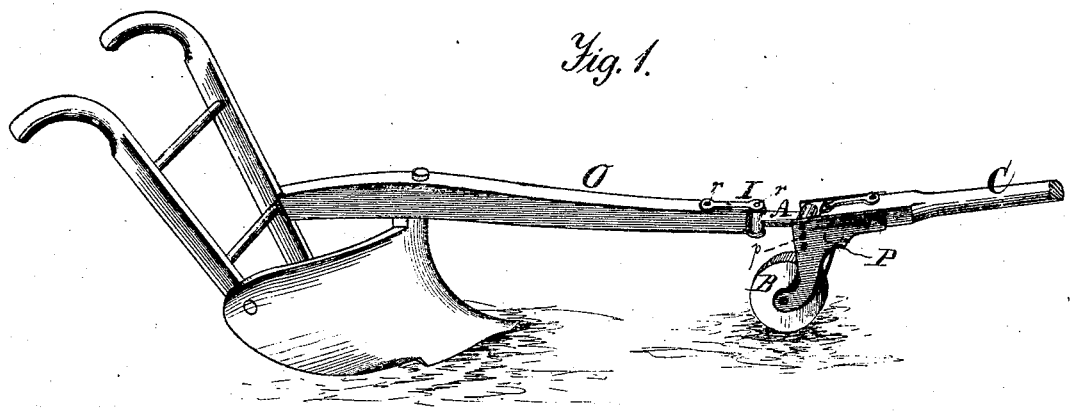
Figure 2:

In the annexed drawings, Figure 1 is a perspective view of a plow with pole attached, and embodying my improvement. Fig. 2 is a perspective view of the coupling.

The beam O of the plow illustrated is linked to the pole C by means of a double-jointed coupling, A, which terminates at its ends in transverse tubular knuckles, U and Y, standing at right angles to each other. In connecting the beam and pole, the knuckle U is arranged in a vertical position between the clevis irons I of the beam, and the knuckle Y, assuming a horizontal position, is inserted between the cheek-pieces P on the pole, after which the joints are completed by the insertion of suitable pins. The cheek-pieces P project beyond the rear end of the pole, and are provided with a vertical series of holes, $p$, to enable the pole to be vertically adjusted on the coupling. The cheek-pieces, extending downward, form supports and bearings for the axle of the gage-wheel B, which determines the depth of cut of the share of the plow. This is regulated by the vertical adjustment of the pole.

What I claim as my invention, and desire to secure by Letters Patent, is—

The combination of plow-beam O, double-jointed coupling A U Y, pole C, cheek-pieces P, having a vertical series of holes, $p$, and single gage-wheel B, substantially as specified.

NORMAN WESTCOTT.

Witnesses:
JAMES S. STEWART,
HARVEY L. HOPKINS.